United States Patent
Higuchi (10) Patent No.: US 8,379,997 B2
(45) Date of Patent: Feb. 19, 2013

(54) IMAGE SIGNAL PROCESSING DEVICE (75) Inventor: Tomohisa Higuchi, Tokyo (JP)

(73) Assignee: Thine Electronics, Inc., Tokyo (JP)

( * ) Notice: Subject to any disclaimer, the term of this patent is extended or adjusted under 35 U.S.C. 154(b) by 302 days.

(21) Appl. No.: 12/672,353

(22) PCT Filed: Aug. 5, 2008

(86) PCT No.: PCT/JP2008/064057
§ 371 (c)(1),
(2), (4) Date: Apr. 26, 2010

(87) PCT Pub. No.: WO2009/020127
PCT Pub. Date: Feb. 12, 2009

(65) Prior Publication Data
US 2010/0220938 A1    Sep. 2, 2010

(30) Foreign Application Priority Data
Aug. 6, 2007  (JP) ............... P2007-204290

(51) Int. Cl.
G06K 9/00    (2006.01)
H04N 7/12    (2006.01)
H04N 5/14    (2006.01)
(52) U.S. Cl. ............ 382/251; 375/240.03; 348/27
(58) Field of Classification Search ........ 382/232, 382/233, 252, 254, 268, 274, 275; 375/240.03; 348/14.13, 27; 345/87, 98
See application file for complete search history.

(56) References Cited

U.S. PATENT DOCUMENTS

| 5,940,130 | A | 8/1999 | Nilsson et al. | |
| 6,317,522 | B1 * | 11/2001 | Rackett | 382/268 |
| 6,756,955 | B2 * | 6/2004 | Someya et al. | 345/88 |
| 7,327,340 | B2 * | 2/2008 | Someya et al. | 345/89 |
| 7,403,183 | B2 * | 7/2008 | Someya | 345/98 |
| 7,961,974 | B2 * | 6/2011 | Someya et al. | 382/274 |

(Continued)

FOREIGN PATENT DOCUMENTS

| JP | 09-512395 A | 12/1997 |
| JP | 2003-152272 A | 6/2003 |
| JP | 2003-202845 A | 7/2003 |
| JP | 2006-208770 A | 8/2006 |
| JP | 2006-251310 A | 9/2006 |

OTHER PUBLICATIONS

Notice of Allowance issued by Korean Patent Office in Korean Patent Application No. 10-2010-7002623 dated May 17, 2011.

Primary Examiner — Kanjibhai Patel
(74) Attorney, Agent, or Firm — Sughrue Mion, PLLC (57) ABSTRACT

An image signal processing device 1 comprises an encoding part 10, a delay part 20, a difference calculation part 30, a decoding part 40, a quantization error determination part 50 and a corrected image data output part 60. The corrected image data output part 60 outputs image data $G_2$ input to the encoding part 10 as corrected image data $G_2'$ when a difference D output from the difference calculation part 30 is equal to or less than a predetermined value $D_{th}$, or determines a basic correction value from the image data $G_2$ input to the encoding part 10 and decoded image data $G_{B1}$ output from the decoding part 40, reduces the basic correction value by a value in accordance with the magnitude of a quantization error E determined by the quantization error determination part 50 to obtain a modified correction value, and outputs the image data $G_2$ input to the encoding part 10, to which the modified correction value is added, as the corrected image data $G_2'$ when the difference D is greater than the predetermined value $D_{th}$.

2 Claims, 4 Drawing Sheets

U.S. PATENT DOCUMENTS

| | | |
|---|---|---|
| 8,090,101 B2 * | 1/2012 | Ye et al. .................... 380/47 |
| 2003/0080983 A1 | 5/2003 | Someya et al. |
| 2004/0217930 A1 | 11/2004 | Someya et al. |
| 2004/0252891 A1 | 12/2004 | Sasaki et al. |
| 2008/0165105 A1 | 7/2008 | Okuda et al. |
| 2008/0174612 A1 | 7/2008 | Someya et al. |

* cited by examiner

IMAGE SIGNAL PROCESSING DEVICE

TECHNICAL FIELD

The present invention relates to an image signal processing device that outputs an image signal to a liquid crystal display device after processing image data of each frame of the image signal.

BACKGROUND ART

An image display device is roughly classified into an impulse type display device and a hold type display device. In a CRT (Cathode Ray Tube) mentioned of as an example of an impulse type display device, a screen is scanned by an electron gun and a display is produced only in pixels that electron beams have reached. In contrast to this, in a liquid crystal display device or an organic electroluminescence display device mentioned of as a hold type display device, a frame of an image signal is updated at a fixed period and when a display of an image of a certain first frame is specified, the display of the image of the first frame is held until a display of an image of the next second frame is specified. Compared to an impulse type display device, a hold type display device has various characteristics, such as that image distortion is unlikely to occur.

However, a liquid crystal display device has a problem that response is slow. That is, it takes time for an actual display value in a liquid crystal display device to reach a target display value after the target display value of an image of a certain frame is specified. There may be a case where the required time exceeds a period at which a frame is updated. Consequently, when a motion picture in which images changes rapidly is displayed on the screen of a liquid crystal display device, there may be a case where blur appears in the motion picture.

As a technique intended to solve such a problem, the overdrive technique is publicly known. According to the overdrive technique, when a certain pixel on the screen of a liquid crystal display device is focused on, if image data $G_2$ corresponding to a target display value in the next second frame is different from image data (luminance) $G_1$ corresponding to a target display value in a certain first frame, the image data $G_2$ is corrected and then, corrected image data $G_2'$ is given to the liquid crystal display device. At the time of the correction, when "$G_1 < G_2$", $G_2$ is corrected so that "$G_2 < G_2'$" and when "$G_1 > G_2$", then corrected so that "$G_2 > G_2'$". By providing an image signal processing device that outputs an image signal to a liquid crystal display device after processing image data of each frame of the image signal as described above, it is made possible for the actual display value to reach the target display value quickly in the liquid crystal display device.

There have been made various proposals relating to the overdrive technique. In the invention disclosed in patent document 1, in order to acquire the corrected image data $G_2'$ by performing predetermined processing based on the image data $G_1$ of a certain first frame and the image data $G_2$ of the next second frame, image data of each frame is encoded and the encoded image data of each frame is delayed by a delay part by a period of time corresponding to one frame. Then, the encoded image data of the frame to be output from the delay part after being decoded by a first decoding part is taken as image data of the first frame and at the same time, the encoded image data of the frame to be input to the delay part after being decoded by a second decoding part is taken as image data of the second frame, and based on the decoded image data of the first frame and that of the second frame, respectively, the corrected image data $G_2'$ is acquired.

With the overdrive technique, image data corresponding to one frame is delayed by the delay part after being encoded, and therefore, the capacity of a memory used as the delay part can be reduced. Further, to the image data of the first frame and the second frame used to acquire the corrected image data $G_2'$, an error substantially the same is attached at the time of encoding processing and decoding processing, and therefore, it is thought that the corrected image data $G_2'$ is not affected by the error.

Patent document 1: Japanese Unexamined Patent Publication (Kokai) No. 2003-202845

DISCLOSURE OF THE INVENTION

However, the overdrive technique, which acquires the corrected image data $G_2'$ through the encoding processing and the decoding processing as described above, requires two decoding parts, and therefore, the size of the image signal processing device is large. Further, there may be a case where the influence of the error at the time of the encoding processing and the decoding processing is exerted on the corrected image data $G_2'$ and the error appears large in the corrected image data $G_2'$, and therefore, there may be a case where the image quality of an image displayed on the screen of the liquid crystal display device is deteriorated due to a flicker etc.

The present invention has been developed in order to solve the above-mentioned problems and an object thereof is to provide an image signal processing device that employs the overdrive technique to acquire corrected image data through encoding processing and decoding processing, which is capable of suppressing the deterioration of image quality due to a flicker etc., and which can be downsized.

An image signal processing device according to the present invention is an image signal processing device that outputs an image signal to a liquid crystal display device after processing image data of each frame of the image signal, the image signal processing device comprising: (1) an encoding part to which image data of each frame of an image signal is input, and which encodes the image data and then outputs the image data that is encoded (hereinafter referred to as "encoded image data"); (2) a delay part to which the encoded image data output from the encoding part is input and which outputs the encoded image data after delaying the data by a period of time corresponding to one frame; (3) a difference calculation part to which the encoded image data output from the delay part is input and at the same time, the encoded image data output from the encoding part is input, and which calculates and outputs a difference between these two pieces of the encoded image data; (4) a decoding part that decodes the encoded image data output from the delay part and outputs the image data that is decoded (hereinafter, referred to as "decoded image data"); (5) a quantization error determination part that determines the magnitude of a quantization error at the time of encoding in the encoding part based on the encoded image data output from the delay part; and (6) a corrected image data output part to which the image data input to the encoding part, the decoded image data output from the decoding part, the value of the difference output from the difference calculation part, and the determination result by the quantization error determination part are input, and which acquires corrected image data based on these data, value and result and outputs the corrected image data that has been acquired to a liquid crystal display device.

Further, in the image signal processing device according to the present invention, the corrected image data output part: (a) outputs image data input to the encoding part as corrected image data when the difference output from the difference calculation part is equal to or less than a predetermined value; and (b) determines a basic correction value from the image data input to the encoding part and the decoded image data output from the decoding part when the difference output from the difference calculation part is greater than the predetermined value, acquires a modified correction value by reducing the basic correction value by a value in accordance with the magnitude of the quantization error determined by the quantization error determination part, and outputs the image data input to the encoding part, to which the modified correction value is added, as corrected image data.

Further, in the image signal processing device according to the present invention, it is preferable for the decoding part to perform decoding processing only when the difference output from the difference calculation part is greater than the predetermined value.

In the image signal processing device according to the present invention, image data of each frame of the image signal is encoded by the encoding part and the image data that is encoded (encoded image data) is output from the encoding part. The encoded image data output from the encoding part is delayed by the delay part by a period of time corresponding to one frame and then output. The encoded image data output from the encoding part and the encoded image data output from the delay part are input to the difference calculation part and a difference between these two pieces of the encoded image data is calculated and output from the difference calculation part. The encoded image data output from the delay part is decoded by the decoding part and the image data that is decoded (decoded image data) is output from the decoding part. By the quantization error determination part, the magnitude of the quantization error at the time of encoding by the encoding part is determined based on the encoded image data output from the delay part.

To the corrected image data output part, the image data input to the encoding part, the decoded image data output from the decoding part, the value of the difference output from the difference calculation part, and the determination result by the quantization error determination part are input, and the corrected image data is acquired based on these data, value and result, and then the corrected image data that is acquired is output to the liquid crystal display device.

In particular, from the corrected image data output part, the image data input to the encoding part is output as corrected image data when the difference output from the difference calculation part is equal to or less than the predetermined value. Conversely, when the difference output from the difference calculation part is greater than the predetermined value, the basic correction value is determined from the image data input to the encoding part and the decoded image data output from the decoding part, the modified correction value is acquired by reducing the basic correction value by a value in accordance with the magnitude of the quantization error determined by the quantization error determination part, and the image data input to the encoding part, to which the modified correction values is added, is output as the corrected image data.

The above-mentioned processing may be performed on the entire image data of the frame, however, when only a partial region of the image to be displayed on the screen is a motion picture, the processing may be performed on the image data corresponding to the partial region.

The image signal processing device according to the present invention employs the overdrive technique to acquire corrected image data through encoding processing and decoding processing, is capable of suppressing image quality from deteriorating due to a flicker etc., and can be downsized.

DESCRIPTION OF THE REFERENCE SYMBOLS

1 image signal processing device
2 liquid crystal display device
10 encoding part
20 delay part
30 difference calculation part
40 decoding part
50 quantization error determination part
60 corrected image data output part
61 determination part
62 correction value determination part
63 correction value modification part
64 addition part
65 selection part

BEST MODES FOR CARRYING OUT THE INVENTION

Preferred embodiments to embody the present invention are described below in detail with reference to the accompanied drawings. In the description of the drawings, the same symbols are attached to the same components and duplicated description is omitted.

Figure 1:
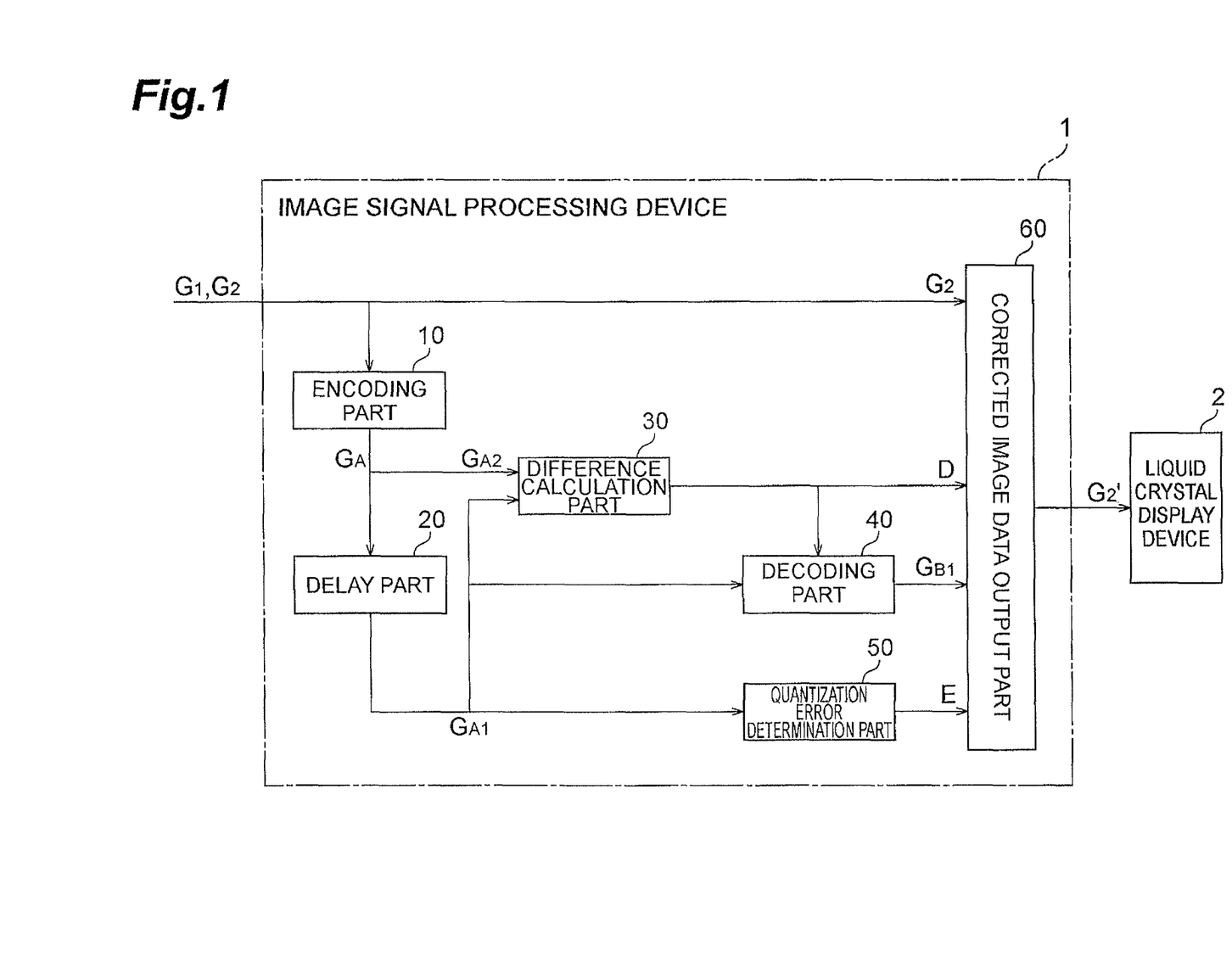
FIG. 1 is a diagram showing a configuration of an image signal processing device 1 according to the present embodiment.

FIG. 1 is a diagram showing a configuration of an image signal processing device 1 according to the present embodiment. The image signal processing device 1 is configured to output an image signal to a liquid crystal display device 2 after processing image data of each frame of the image signal, comprising an encoding part 10, a delay part 20, a difference calculation part 30, a decoding part 40, a quantization error determination part 50 and a corrected image data output part 60. In the case of a color image, the image data of one color of the color image is described below, however, the description also applies to the image data of the other colors.

To the encoding part 10, image data of each frame of an image signal is input and, the encoding part 10 encodes the image data and outputs the image data that is encoded (encoded image data) $G_A$ to the delay part 20 and the difference calculation part 30, respectively. The encoding processing in the encoding part 10 may be based on an arbitrary algorithm, and for example, block encoding, such as FBTC and GBTC, two-dimensional discrete cosine transform encoding, such as JPEG, predictive encoding, such as JPEG-LS, and wavelet transform, such as JPEG 2000, are used. The encoding processing in the encoding part 10 may be reversible encoding or irreversible encoding. The image signal processing device 1 according to the present embodiment can be used preferably even if the encoding processing is irreversible.

To the delay part 20, the encoded image data $G_A$ output from the encoding part 10 is input, and the delay part 20 outputs the encoded image data $G_A$ after delaying the data by a period of time corresponding to one frame. The delay part 20 outputs the encoded image data $G_A$ to the difference calculation part 30, the decoding part 40, and the quantization error determination part 50, respectively.

To the difference calculation part 30, encoded image data $G_{A2}$ output from the encoding part 10 is input and at the same time, encoded image data $G_{A1}$ output from the delay part 20 is input, and the difference calculation part 30 calculates a difference D between these two pieces of the encoded image data $G_A$ and outputs the value of the difference D to the corrected image data output part 60. Here, the encoded image data $G_{A2}$ output from the encoding part 10 belongs to a second frame that follows a first frame, with respect to the encoded image data $G_{A1}$ of the first frame to be output from the delay part 20. The encoded image data $G_{A1}$, $G_{A2}$ simultaneously input to the difference calculation part 30 correspond to common pixels on the screen of the liquid crystal display device 2.

The decoding part 40 decodes the encoded image data $G_{A1}$ output from the delay part 20 and outputs image data $G_{B1}$ that is decoded (decoded image data) to the corrected image data output part 60. The decoding part 40 may be configured so as to perform decoding processing only when the value of the difference D output from the difference calculation part 30 is greater than a predetermined value $D_{th}$. The decoding processing in the decoding part 40 corresponds to the encoding processing in the encoding part 10.

The quantization error determination part 50 determines the magnitude of a quantization error E at the time of encoding in the encoding part 10 based on the encoded image data $G_{A1}$ output from the delay part 20 and outputs the determination result (quantization error E) to the corrected image data output part 60.

To the corrected image data output part 60, image data $G_2$ of the second frame to be input to the encoding part 10, the decoded image data $G_{B1}$ of the first frame to be output from the decoding part 40, the value of the difference D output from the difference calculation part 30, and the determination result (quantization error E) by the quantization error determination part 50 are input, and the corrected image data output part 60 acquires corrected image data $G_2'$ based on these data, value and result and outputs the corrected image data $G_2'$ that is acquired to the liquid crystal display device 2.

Specifically, when the difference D output from the difference calculation part 30 is equal to or less than the predetermined value $D_{th}$, the corrected image data output part 60 outputs the image data $G_2$ input to the encoding part 10 as the corrected image data $G_2'$ Further, when the difference D output from the difference calculation part 30 is greater than the predetermined value $D_{th}$, the corrected image data output part 60 determines a basic correction value from the image data $G_2$ input to the encoding part 10 and the decoded image data $G_{B1}$ output from the decoding part 40, acquires a modified correction value by reducing the basic correction value by a value in accordance with the magnitude of the quantization error E determined by the quantization error determination part 50, and outputs the image data $G_2$ input to the encoding part 10, to which the modified correction value is added, as the corrected image data $G_2'$.

Figure 2:
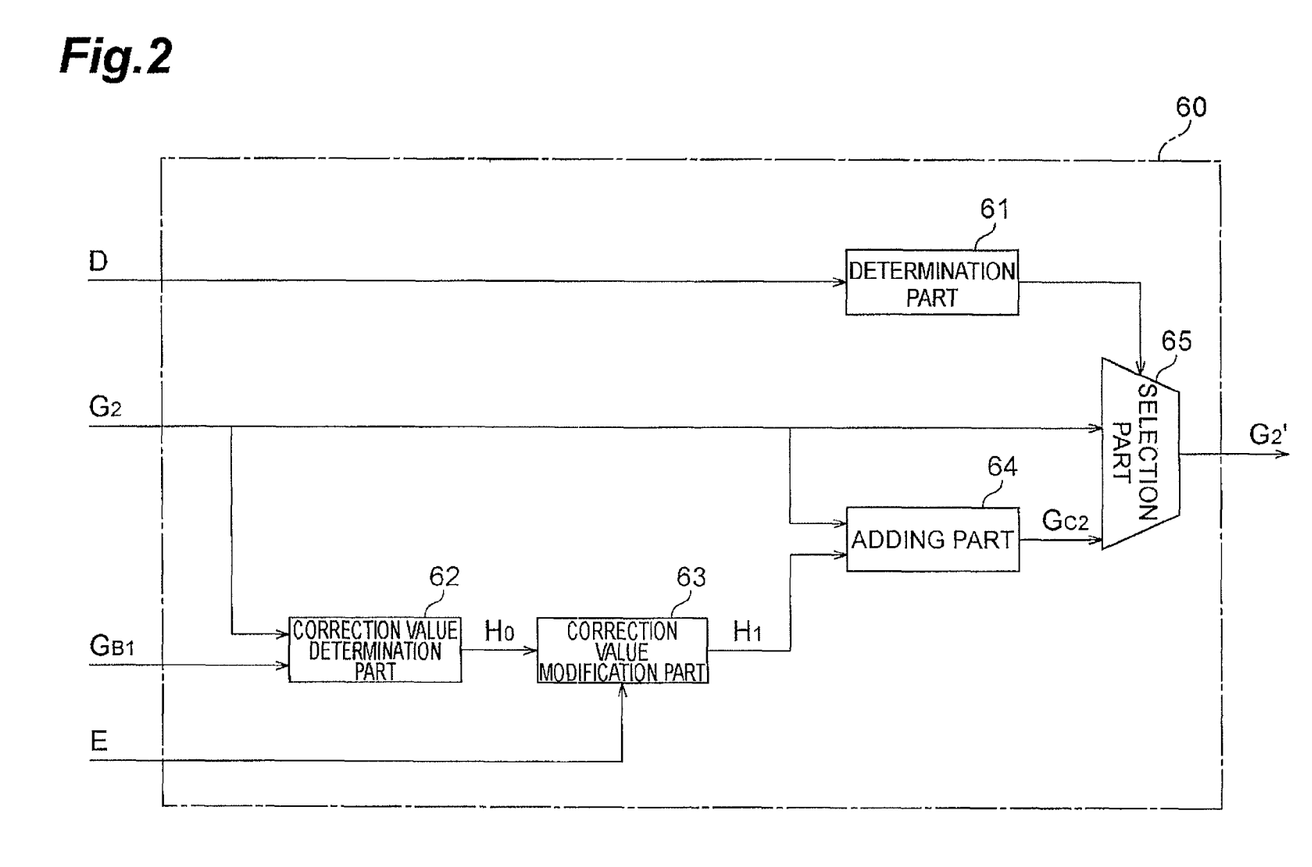
FIG. 2 is a diagram showing a configuration of a corrected image data output part 60 included in the image signal processing device 1 according to the present embodiment.

FIG. 2 is a diagram showing a configuration of the corrected image data output part 60 included in the image signal processing device 1 according to the present embodiment. The corrected image data output part 60 includes a determination part 61, a correction value determination part 62, a correction value modification part 63, an addition part 64 and a selection part 65.

The determination part 61 compares the magnitude of the value of the difference D output from the difference calculation part 30 with that of the predetermined value $D_{th}$ and outputs a signal indicative of the comparison result to the selection part 65. To the correction value determination part 62, the image data $G_2$ of the second frame input to the encoding part 10 is input and at the same time, the decoded image data $G_{B1}$ of the first frame output from the decoding part 40 is input, and the correction value determination part 62 outputs a basic correction value $H_0$ corresponding to data ($G_{B1}$, $G_2$) to the correction value modification part 63. At this time, the correction value determination part 62 may determine the basic correction value $H_0$ by calculation or determine the basic correction value $H_0$ using a lookup table.

The correction value modification part 63 reduces the basic correction value $H_0$ output from the correction value determination part 62a by a value in accordance with the magnitude of the quantization error E determined by the quantization error determination part 50, and outputs the value that is reduced as a modified correction value $H_1$ to the addition part 64. The processing to acquire the modified correction value $H_1$ from the basic correction value $H_0$ in the correction value modification part 63 may be such that in which the modified correction value $H_1$ is acquired by multiplying the basic correction value $H_0$ by a coefficient, which is the smaller, the greater the quantization error E is, or such that in which the modified correction value $H_1$ is acquired by subtracting a coefficient, which is the greater, the greater the quantization error E is, from the basic correction value $H_0$. The addition part 64 adds the modified correction value $H_1$ output from the correction value modification part 63 to the image data $G_2$ of the second frame to be input to the encoding part 10 and outputs the result of the addition to the selection part 65 as image data $G_{C2}$.

To the selection part 65, the image data $G_2$ of the second frame to be input to the encoding part 10, the image data $G_{C2}$ output from the addition part 64, and a signal indicative of the determination result output from the determination part 61 are input. Then the selection part 65 outputs the image data $G_2$ of the second frame to be input to the encoding part 10 to the liquid crystal display device 2 as the corrected image data $G_2'(G_2'=G_2)$ when the determination part 61 determines that the value of the difference D is equal to or less than the predetermined value $D_{th}$ ($D \leq D_{th}$). Conversely, the selection part 65 outputs the image data $G_{C2}$ output from the addition part 64 to the liquid crystal display device 2 as the corrected image data $G_2'(G_{C2}=G_2)$ when the determination part 61 determines that the value of the difference D is greater than the predetermined value $D_{th}(D>D_{th})$. This determination is made for each pixel.

In the image signal processing device 1 according to the present embodiment, the image data of each frame of an image signal is encoded by the encoding part 10 and then, the encoded image data $G_A$ that is encoded is output to the delay part 20 and the difference calculation part 30, respectively, from the encoding part 10. The encoded image data $G_A$ output from the encoding part 10 is output after being delayed by a period of time corresponding to one frame by the delay part 20.

The encoded image data $G_{A2}$ of the second frame to be output from the encoding part 10 and the encoded image data $G_{A1}$ of the first frame to be output from the delay part 20 are input to the difference calculation part 30 and the difference D between these two pieces of the encoded image data is calculated. The value of the difference D is output from the difference calculation part 30 to the corrected image data output part 60.

The encoded image data $G_{A1}$ output from the delay part 20 is decoded by the decoding part 40 and the decoded image data $G_{B1}$ that is decoded is output from the decoding part 40 to the corrected image data output part 60. Further, the quantization error determination part 50 determines the magnitude of the quantization error E at the time of encoding in the encoding part 10 based on the encoded image data $G_{A1}$ output from the delay part 20 and the determination result (quantization error E) is output from the quantization error determination part 50 to the corrected image data output part 60.

To the corrected image data output part 60, the image data $G_2$ of the second frame to be input to the encoding part 10, the decoded image data $G_{B1}$ of the first frame to be output from the decoding part 40, the value of the difference D output from the difference calculation part 30, and the determination result (quantization error E) by the quantization error determination part 50 are input, and the corrected image data $G_2'$ is acquired based on these data, value and result and the corrected image data $G_2'$ that is acquired is output to the liquid crystal display part 2.

In particular, in the corrected image data output part 60, when the difference D output from the difference calculation part 30 is equal to or less than the predetermined value $D_{th}$, the image data $G_2$ input to the encoding part 10 is output as the corrected image data $G_2'$. Further, in the corrected image data output part 60, when the difference D output from the difference calculation part 30 is greater than the predetermined value $D_{th}$, the basic correction value is determined from the image data $G_2$ input to the encoding part 10 and the decoded image data $G_{B1}$ output from the decoding part 40, and the modified correction value is acquired by reducing the basic correction value by a value in accordance with the magnitude of the quantization error E determined by the quantization error determination part 50, and then the image data $G_2$ input the encoding part 10, to which the modified correction value is added, is output as the corrected image data $G_2'$.

When the corrected image data output part 60 has the configuration in FIG. 2, the determination part 61 compares the magnitude of the value of the difference D output from the difference calculation part 30 with that of the predetermined value $D_{th}$ and a signal indicative of the comparison result is output to the selection part 65. The image data $G_2$ of the second frame to be input to the encoding part 10 and the decoded image data $G_{B1}$ of the first frame to be output from the decoding part 40 are input to the correction value determination part 62 and the basic correction value $H_0$ corresponding to the data ($G_{B1}$, $D_2$) is output from the correction value determination part 62 to the correction value modification part 63.

The basic correction value $H_0$ output from the correction value determination part 62 is reduced by a value in accordance with the magnitude of the quantization error E determined by the quantization error determination part 50 by the correction value modification part 63, and the value that is reduced is output from the correction value modification part 63 to the addition part 64 as the modified correction value $H_1$.

In the addition part 64, the modified correction value $H_1$ output from the correction value modification part 63 is added to the image data $G_2$ of the second frame to be input to the encoding part 10 and the addition result is output from the addition part 64 to the selection part 65 as the image data $G_{C2}$.

Then, in the selection part 65, when the determination part 61 determines that the value of the difference D is equal to or less than the predetermined value $D_{th}$, the image data $G_2$ of the second frame to be input to the encoding part 10 is output to the liquid crystal display device 2 as the corrected image data $G_2'$. Conversely, when the determination part 61 determines that the value of the difference D is greater than the predetermined value $D_{th}$, the image data $G_{C2}$ output from the addition part 64 is output from the addition part 64 to the liquid crystal display device as the corrected image data $G_2'$.

Figure 3:
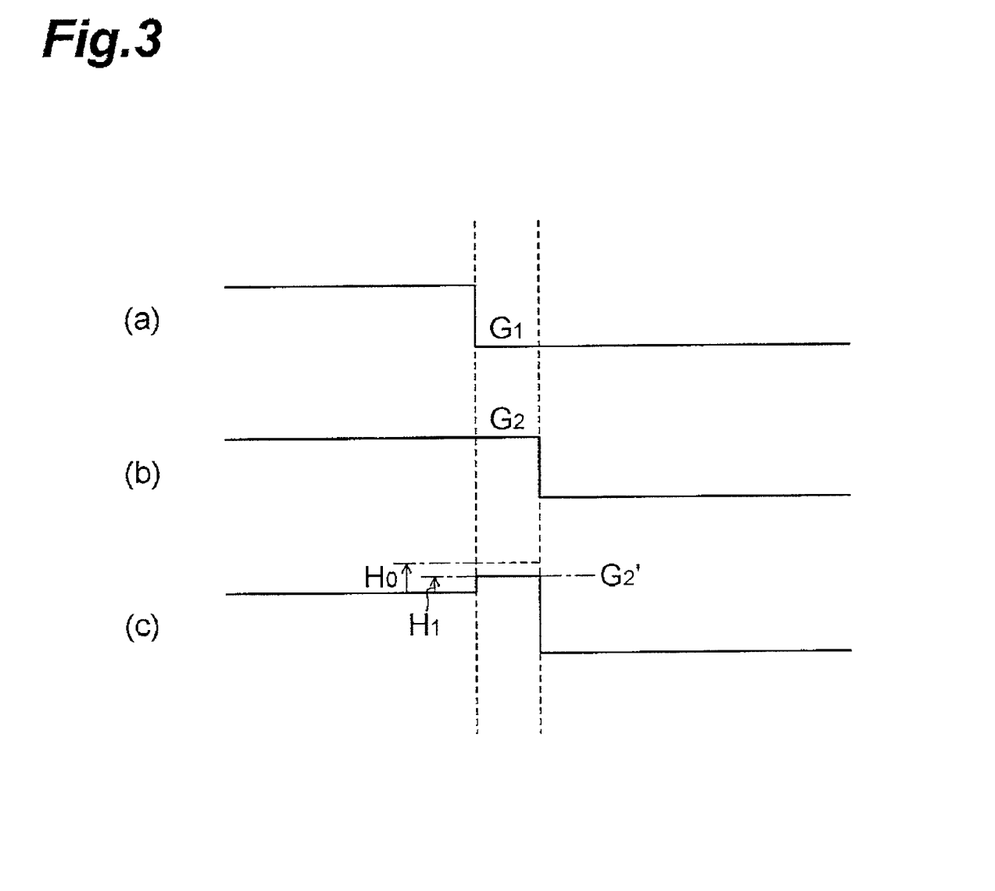
FIG. 3 is a diagram for describing image data $G_1$ of a first frame and image data $G_2$ of a second frame to be input to the image signal processing device 1, and corrected image data $G_2'$ output from the image signal processing device 1 to a liquid crystal image device 2 according to the present embodiment.
Figure 4:
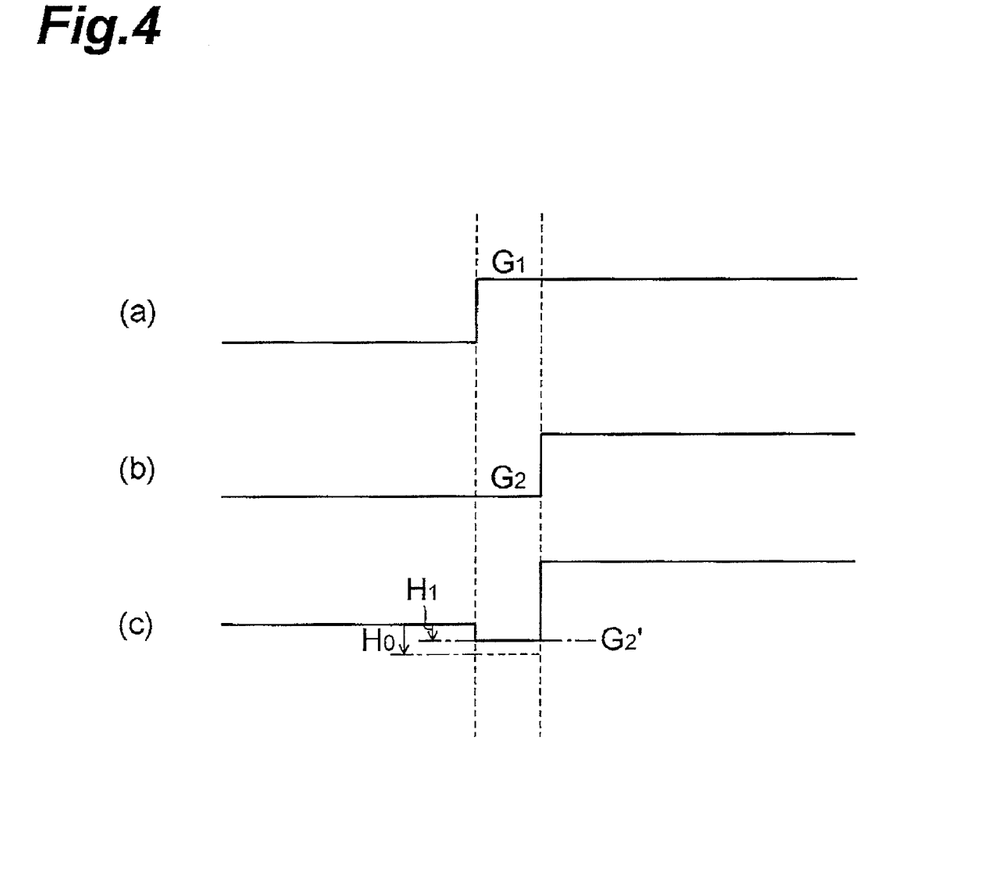
FIG. 4 is a diagram for describing the image data $G_1$ of the first frame and the image data $G_2$ of the second frame to be input to the image signal processing device 1, and the corrected image data $G_2'$ output from the image signal processing device 1 to the liquid crystal image device 2 according to the present embodiment.

FIG. 3 and FIG. 4 are each a diagram for describing the image data $G_1$ of the first frame and the image data $G_2$ of the second frame to be input to the image signal processing device 1 according to the present embodiment, and the corrected image data $G_2'$ output from the image signal processing device 1 to the liquid crystal display device 2. The horizontal axis in each of Figs. (a) to (c) represents the position of a pixel on a certain line in an image of a frame. Fig. (a) shows a distribution of image data (luminance) on the line of the first frame, Fig. (b) shows a distribution of image data on the line of the second frame, and Fig. (c) shows a distribution of corrected image data on the line. The step in luminance in the figure represents an edge of an image. A pixel in the center in each of Figs. (a) to (c) is focused on.

In the example shown in FIG. 3, compared to the image data $G_1$ of the focused pixel in the first frame, the image data $G_2$ of the focused pixel in the next second frame is greater (Figs. (a), (b)), and therefore, the corrected image data $G_2'$ of the focused pixel to be output is regarded to be a value greater than the image data $G_2$ (Fig. (c)). At this time, when the quantization error E is large, the basic correction value $H_0$ is reduced and becomes small and is regarded as the modified correction value $H_1$ and the value of the image data $G_2$, to which the modified correction value $H_1$ is added, is taken as the corrected image data $G_2'$.

In the example shown in FIG. 4, the image data $G_2$ of the focused pixel in the next second frame is smaller compared to the image data $G_1$ of the focused pixel in the first frame (FIGS. 4(a), (b)), and therefore, the corrected image data $G_2'$ of the focused pixel to be output is regarded to be a value smaller than the image data $G_2$ (FIG. 4(c)). At this time, the absolute value of the basic correction value $H_0$ (negative value) is reduced and becomes smaller in accordance with the magnitude of the quantization error E and this is taken as the modified correction value $H_1$ (negative value) and the value of the image data $G_2$, to which the modified correction value $H_1$ is added, is taken as the corrected image data $G_2'$.

When the image data $G_2'$ after being corrected based on the overdrive technique is input to the liquid crystal display device 2, it is made possible for the actual display value of the liquid crystal display device 2 to quickly reach the target display value.

In the conventional image signal processing device described in patent document 1, when the errors at the time of encoding included in the image data of the first frame and the second frame after being decoded are the same, the errors are canceled out at the time of later processing, and when these two errors are both positive or both negative as the same time, the absolute value of the error becomes smaller at the time of later processing, and therefore, there is no problem (or a minor problem, if any). However, when one of the two errors, that is, an error $e_1$, is positive and the other, that is, an error $e_2$, is negative, the absolute value of the error ($e_1-e_2$) becomes large and the error appears significantly in the corrected image data $G_2'$, and therefore, the image quality of an image displayed on the screen of the liquid crystal display device is deteriorated due to a flicker etc.

In contrast to this, in the image signal processing device 1 according to the present embodiment, the image data $G_2$ is generated based on the decoded image data $G_{B1}$ of the first frame output from the decoding part 40 and the image data $G_2$ of the second frame before encoding processing and either one of the image data $G_2$ and the image data $G_{C2}$ is taken as the image data $G_{C2}$, and therefore, the problem of error enlargement of the above-mentioned conventional device is suppressed from arising and the deterioration of the image quality due to a flicker etc. can be suppressed in an image displayed on the screen of the liquid crystal display device.

Further, in the image signal processing device 1 according to the present embodiment, the modified correction value $H_1$ is acquired by reducing the basic correction value $H_0$ by a value in accordance with the magnitude of the quantization error E, and the value of the image data $G_2$, to which the modified correction value $H_1$ is added, is taken as the corrected image data $G_2'$. Consequently, even if an error is included in the basic correction value $H_0$, the value of the image data $G_2$, to which the modified correction value $H_1$ the absolute value of which is smaller than that of the basic correction value $H_0$ is added, is taken as the corrected image data $G_2'$, and therefore, an excessive overdrive is suppressed from being performed and in this point also, the image quality can be suppressed from being deteriorated.

Furthermore, in the image signal processing device 1 according to the present embodiment, when the difference D output from the difference calculation part 30 is equal to or less than the predetermined value $D_{th}$, the image data $G_2$ before encoding processing is output as the corrected image data $G_2'$. Because of this, overdrive is not performed when an image is a still image or when the speed of motion of an image is slow, and therefore, the image quality can be suppressed from being deteriorated.

Still furthermore, the image signal processing device 1 according to the present embodiment can be downsized compared to the conventional image signal processing device that requires two decoding parts because only the decoding part 40 needs to be comprised.

The invention claimed is:

1. An image signal processing device that outputs an image signal to a liquid crystal display device after processing image data of each frame of the image signal, the device comprising:
    an encoding part to which the image data of each frame of the image signal is input, and which encodes the image data and outputs encoded image data, which is the image data that is encoded;
    a delay part to which the encoded image data output from the encoding part is input, and which outputs the encoded image data after delaying the data by a period of time corresponding to one frame;
    a difference calculation part to which the encoded image data output from the encoding part is input and at the same time, to which the encoded image data output from the delay part is input, and which calculates a difference between these two pieces of the encoded image data and outputs the difference;
    a decoding part that decodes the encoded image data output from the delay part and outputs decoded image data, which is the image data that is decoded;
    a quantization error determination part that determines the magnitude of a quantization error at the time of encoding in the encoding part based on the encoded image data output from the delay part; and
    a corrected image data output part to which the image data input to the encoding part, the decoded image data output from the decoding part, the value of the difference output from the difference calculation part, and the determination result by the quantization error determination part are input, and which acquires corrected image data based on these data, value and result and outputs the corrected image data that is acquired to the liquid crystal display device, wherein
    the corrected image data output part:
        outputs the image data input to the encoding part as the corrected image data when the difference output from the difference calculation part is equal to or less than a predetermined value; and
        determines a basic correction value from the image data input to the encoding part and the decoded image data output from the decoding part, reduces the basic correction value by a value in accordance with the magnitude of the quantization error determined by the quantization error determination part to acquire a modified correction value, and outputs the image data input to the encoding part, to which the modified correction value is added, as the corrected image data when the difference output from the difference calculation part is greater than the predetermined value.

2. The image signal processing device according to claim 1, wherein
    the decoding part performs decoding processing only when the difference output from the difference calculation part is greater than the predetermined value.

* * * * *